(12) United States Patent
Kiwan et al.

(10) Patent No.: US 11,143,124 B2
(45) Date of Patent: Oct. 12, 2021

(54) SYSTEMS AND METHODS FOR EXHAUST GAS RECIRCULATION VALVE CALIBRATION

(71) Applicant: Ford Global Technologies, LLC, Dearborn, MI (US)

(72) Inventors: Rani Kiwan, Dearborn, MI (US); Imtiaz Ali, Lathrup Village, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/795,911

(22) Filed: Feb. 20, 2020

(65) Prior Publication Data

US 2021/0262402 A1    Aug. 26, 2021

(51) Int. Cl.
*F02D 41/00* (2006.01)
*F02M 26/14* (2016.01)
*F02M 26/47* (2016.01)
*F02M 26/00* (2016.01)

(52) U.S. Cl.
CPC ..... *F02D 41/0077* (2013.01); *F02D 41/0072* (2013.01); *F02M 26/14* (2016.02); *F02M 26/47* (2016.02); *F02D 2200/0406* (2013.01); *F02M 2026/001* (2016.02)

(58) Field of Classification Search
CPC .. F02D 41/00; F02D 41/0077; F02D 41/0072; F02D 2200/0406; F02M 26/14; F02M 26/47; F02M 2026/001
See application file for complete search history.

(56) References Cited

U.S. PATENT DOCUMENTS

| | | | |
|---|---|---|---|
| 5,190,017 A | 3/1993 | Cullen et al. | |
| 5,374,031 A | 12/1994 | Semence et al. | |
| 6,295,975 B1 | 10/2001 | Yew et al. | |
| 6,321,732 B1 * | 11/2001 | Kotwicki | F02D 41/182 |
| | | | 123/568.16 |
| 6,415,776 B1 | 7/2002 | Gates et al. | |

(Continued)

FOREIGN PATENT DOCUMENTS

| | | |
|---|---|---|
| WO | 03018229 A1 | 3/2003 |
| WO | 2007125204 A1 | 11/2007 |
| WO | 2013030562 A1 | 3/2013 |

*Primary Examiner* — Hieu T Vo
(74) *Attorney, Agent, or Firm* — Geoffrey Brumbaugh; McCoy Russell LLP

(57) ABSTRACT

Methods and systems are provided for calibrating an effective area associated with an exhaust gas recirculation valve and/or a variable orifice associated with the exhaust gas recirculation valve. In one example, a method may include attaining a first steady-state intake pressure with the exhaust gas recirculation valve closed, determining a second steady-state intake pressure and a differential pressure across the variable orifice with the exhaust gas recirculation valve open, and estimating the variable orifice effective area based on the second steady-state intake pressure and the differential pressure. In this way, a calibration table may be updated for an exhaust gas recirculation control apparatus that includes an exhaust gas recirculation valve and a variable orifice, such that an actual amount of recirculated exhaust gas reflects a commanded amount.

20 Claims, 7 Drawing Sheets

(56) References Cited

U.S. PATENT DOCUMENTS

| | | | |
|---|---|---|---|
| 6,609,058 B1 * | 8/2003 | Russell | F02M 26/47 |
| | | | 701/104 |
| 6,698,717 B1 | 3/2004 | Brookshire et al. | |
| 6,944,530 B2 | 9/2005 | Russell et al. | |
| 7,013,880 B2 | 3/2006 | Watanuki et al. | |
| 7,743,757 B2 | 6/2010 | Gates et al. | |
| 8,511,290 B2 | 8/2013 | Okumura et al. | |
| 9,267,453 B2 | 2/2016 | Watson | |
| 9,644,567 B2 * | 5/2017 | Iwase | F02D 41/0065 |
| 9,845,749 B2 | 12/2017 | Surnilla et al. | |
| 2007/0063163 A1 | 3/2007 | Yeary et al. | |

* cited by examiner

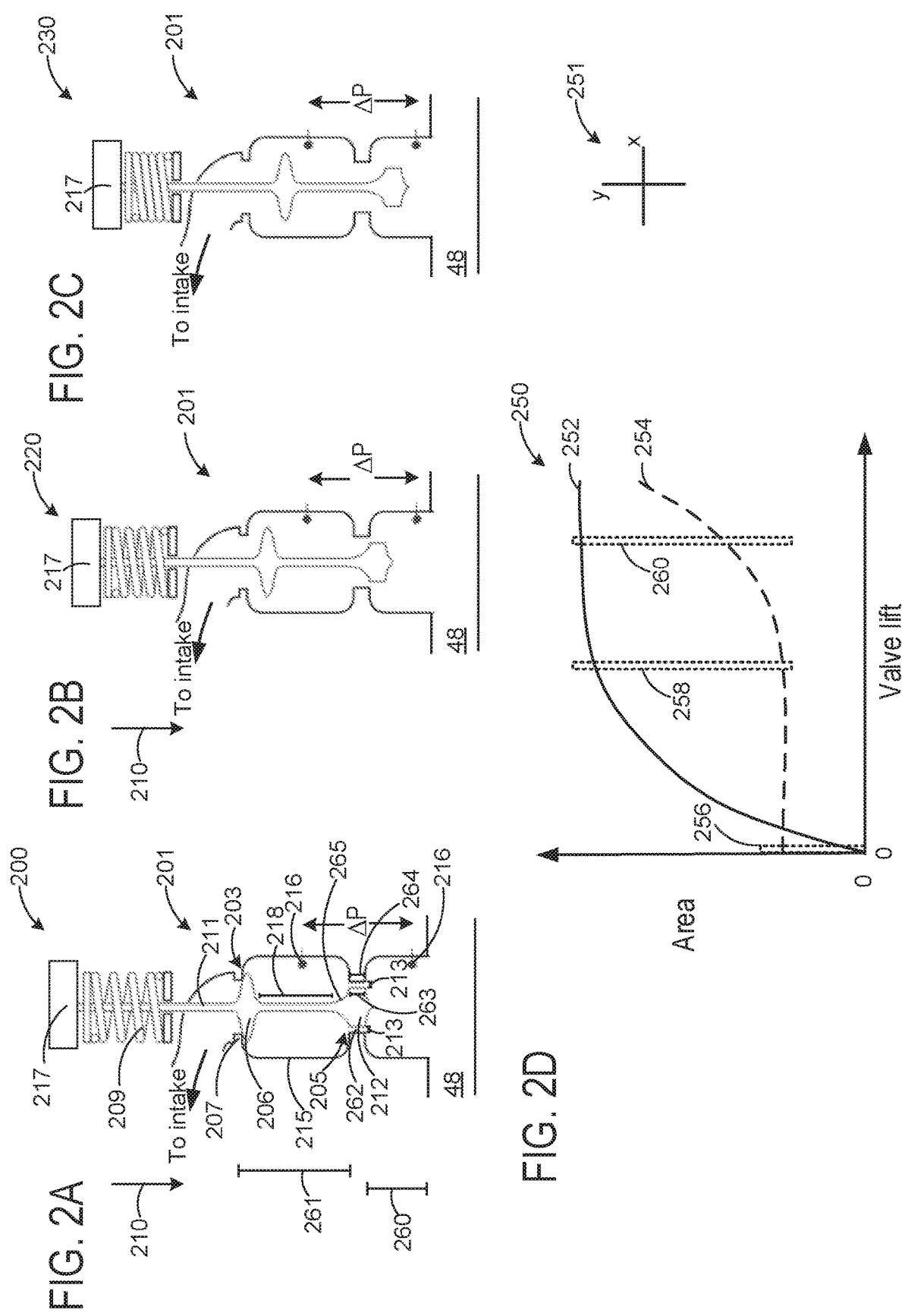

SYSTEMS AND METHODS FOR EXHAUST GAS RECIRCULATION VALVE CALIBRATION

FIELD

The present description relates generally to methods and systems for measuring and correcting for relative area errors associated with a variable orifice and/or an exhaust gas recirculation valve of an exhaust gas recirculation control device.

BACKGROUND/SUMMARY

Exhaust gas recirculation (EGR) may improve fuel economy in a number of ways. As examples, EGR may improve fuel economy by lowering pumping losses at low engine loads, by allowing more optimal spark timing by mitigating knock at mid-to-high loads, and by lowering the need for fuel enrichment by reducing exhaust temperature at high load and high speed conditions.

For fuel economy benefits to be realized, accurate EGR estimation is required. For example, errors in the calculation of EGR content in the intake of an engine may lead to errors in air-charge estimation and poor transient emissions control. In another example, such errors may lead to partial burns and misfires, in cases where EGR content is under-estimated. In yet another example, such errors may result in engine knock, in cases where EGR content is over-estimated.

In some examples, EGR estimation may be accomplished via the inferring of a pressure difference across a fixed orifice associated with an EGR valve (e.g., upstream of the EGR valve). Yet there may be challenges related to orifice-sizing associated with the use of fixed orifices for EGR estimation purposes. For example, reliance on smaller orifices sized to maintain a pressure difference across the orifice above a threshold for accurate flow estimation may restrict EGR flow, and thus benefits, at higher engine speeds and loads. On the other hand, reliance on larger orifices sized to enable a desired EGR flow at higher speeds and loads may result in low pressure differences across the orifice, and thereby degraded EGR estimation accuracy, at lower engine speeds and loads.

U.S. Pat. No. 7,743,757 discloses a two-orifice, two valve EGR dual conduit control apparatus that can be controlled to deliver a wide dynamic range of EGR flow rates. Therein, the valves, orifices, and conduits are sized differentially to provide desired control at different flow rates, and a single differential pressure sensor is relied upon for monitoring pressures in the conduits associated with the EGR control apparatus.

However, the inventors have herein recognized potential issues with such an EGR control apparatus. For example, the reliance on two valves and two orifices introduces additional cost, complexity, and control issues to the engine system. As another example, use of a single differential pressure sensor may introduce difficulties in accurately determining areas associated with the orifices, particularly in response to deposit buildup occurring at one or more of the orifices and/or valves.

The inventors herein have recognized the above-mentioned issues and have herein developed systems and methods to at least partially address them. In one example, a method comprises controlling a pressure in an intake passage of an engine to a first steady-state intake pressure with an exhaust gas recirculation valve closed, commanding the exhaust gas recirculation valve open (e.g., to a predetermined open position) and determining a second steady-state intake pressure and a differential pressure across a variable orifice associated with the exhaust gas recirculation valve, and estimating a variable orifice effective area based on the second steady-state intake pressure and the differential pressure. In this way, an effective area of the variable orifice may readily be determined for an exhaust gas recirculation control apparatus positioned in an exhaust gas recirculation passage, where the exhaust gas recirculation control apparatus includes both the exhaust gas recirculation valve and the variable orifice.

In one example of such a method, each of the exhaust gas recirculation valve and the variable orifice may be actuated via a single or common actuator.

As another example of such a method, the method may further comprise obtaining or developing a set of transfer functions that relate the pressure in the intake of the engine to an exhaust gas recirculation mass flow across the variable orifice at different open positions of the exhaust gas recirculation valve. In such an example, estimating the variable orifice effective area based on the second steady-state intake pressure and the differential pressure may further include relying on a transfer function selected from the set of transfer functions to infer the exhaust gas recirculation mass flow across the variable orifice as a function of the second steady-state pressure. The exhaust gas recirculation mass flow across the variable orifice and the differential pressure may be used to estimate the variable orifice effective area. In some examples, such a method may further include estimating an exhaust gas recirculation valve effective area based on the exhaust gas recirculation mass flow across the variable orifice as a function of the second steady-state pressure and an estimated pressure difference across the exhaust gas recirculation valve.

As another example of such a method, in the absence of any degradation associated with the exhaust gas recirculation control apparatus, the exhaust gas recirculation valve may have a zero effective area when commanded fully closed, and the variable orifice may have a positive non-zero area under conditions where the exhaust gas recirculation valve is fully closed.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A depicts a schematic illustration of an EGR control apparatus of the present disclosure in a first configuration;

FIG. 2B depicts a schematic illustration of the EGR control apparatus of FIG. 2A in a second configuration;

FIG. 2C depicts a schematic illustration of the EGR control apparatus of FIG. 2A in a third configuration;

FIG. 2D graphically depicts variable orifice and valve area as a function of valve lift for the EGR control apparatus of FIG. 2A;

DETAILED DESCRIPTION

The following description relates to systems and methods for determining areas associated with an exhaust gas recirculation (EGR) control apparatus, where the EGR control apparatus includes an EGR valve and a variable orifice that is not the EGR valve. Thus specifically, the following description relates to determining an EGR valve effective area, and determining an EGR variable orifice effective area. Engine operation and use of EGR may be controlled as a function of the determined valve and orifice effective areas, for example. Discussed herein, it may be understood that the EGR control apparatus includes both the EGR valve and the variable orifice. Discussed herein, the EGR valve and the variable orifice may be referred to as an EGR valve means, and a variable orifice means, respectively. In another example, the EGR valve and the variable orifice may be referred to as an EGR valve aspect or portion, and a variable orifice aspect or portion, respectively. Discussed herein, the EGR control apparatus may be alternatively referred to as an EGR control regulator or an EGR control device.

Figure 1:
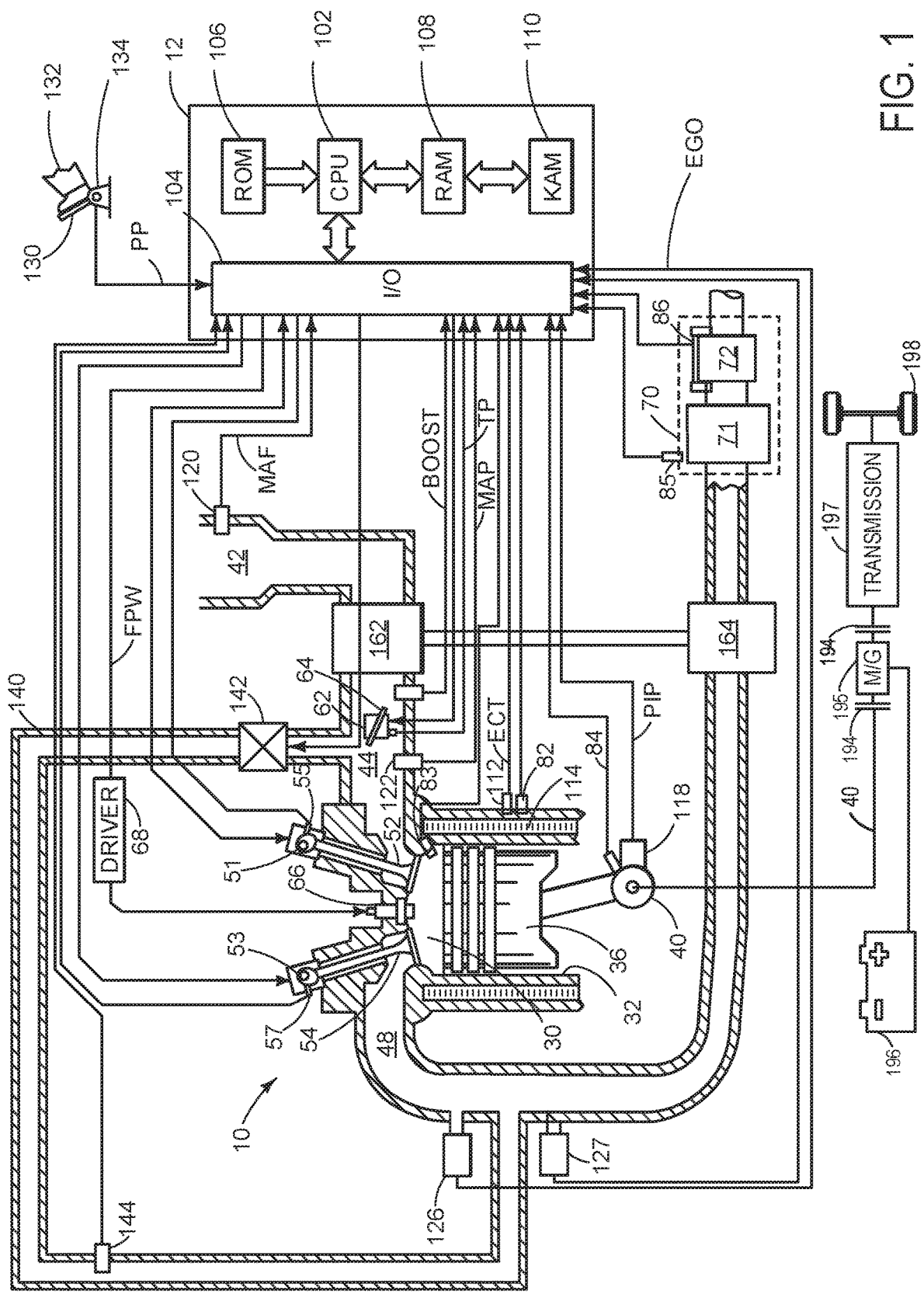
FIG. 1 shows a schematic diagram of an engine.

The EGR control apparatus may be positioned in an EGR passage that couples an exhaust passage of an engine to an intake passage of the engine. Accordingly, FIG. 1 depicts an example engine including an EGR control apparatus positioned in the EGR passage. The methods for determining EGR valve effective area and variable orifice effective area may apply to a high-pressure (HP) EGR system, and thus a HP-EGR system is depicted at FIG. 1.

The EGR control apparatus may in some examples be comprised of a poppet-style valve and variable orifice. Accordingly, FIGS. 2A-2C mechanistically illustrate how such an EGR control apparatus comprised of the poppet-style valve and variable orifice may operate. FIG. 2D graphically depicts effective area for each of the poppet-style valve and variable orifice of the type of EGR control apparatus depicted at FIGS. 2A-2C as a function of valve lift.

Figure 3B:
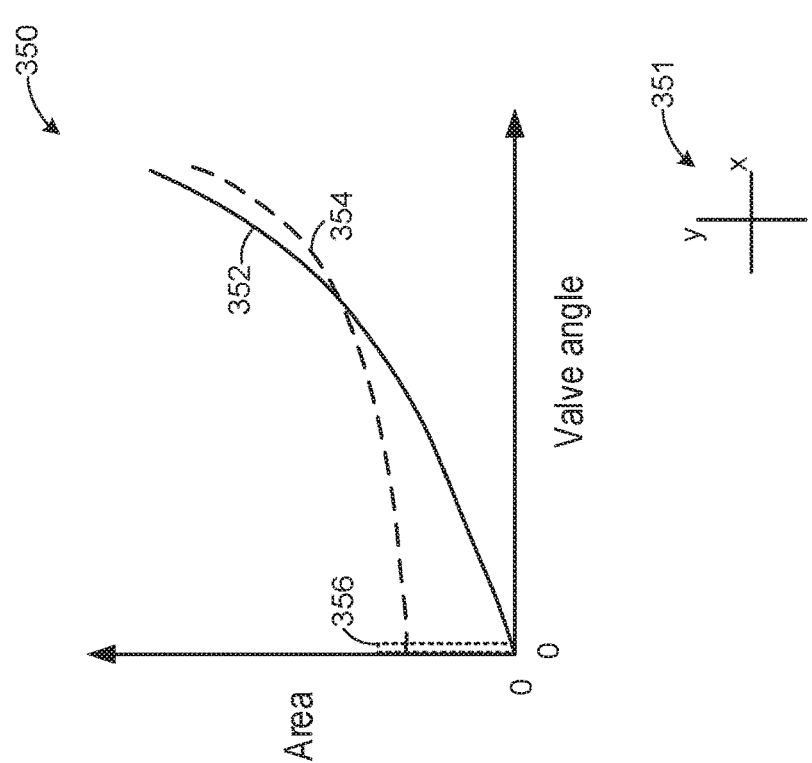
FIG. 3B graphically depicts orifice area as a function of valve lift for the EGR control apparatus of FIG. 3A.
Figure 3A:
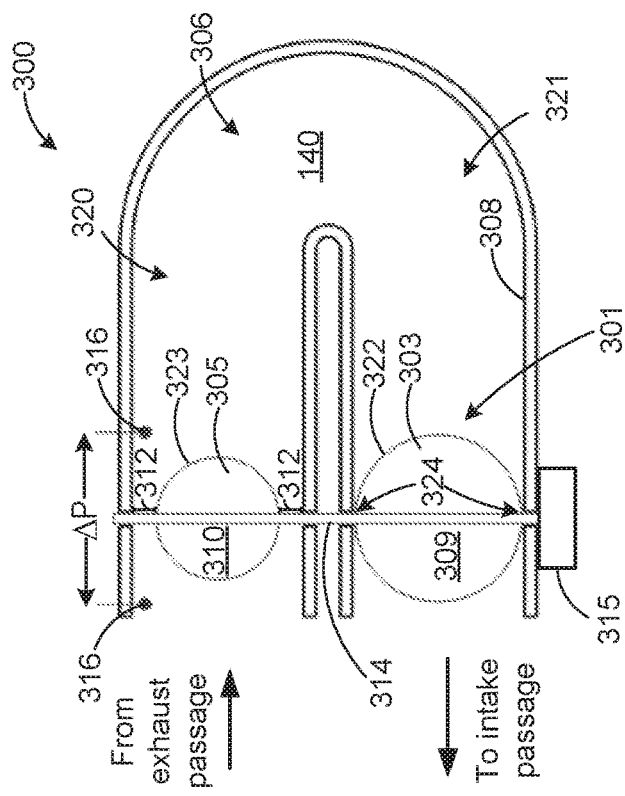
FIG. 3A depicts a schematic illustration of another EGR control apparatus of the present disclosure.

In another example, the EGR control apparatus may be comprised of a butterfly-style valve and variable orifice. Accordingly, such an EGR control apparatus is depicted at FIG. 3A. FIG. 3B graphically depicts effective area for each of the butterfly-style valve and variable orifice of the type of EGR control apparatus depicted at FIG. 3B as a function of valve angle.

Briefly, methodology for determining the effective areas associated with EGR control apparatuses of the present disclosure may include, offline and under deceleration fuel shut off (DFSO) conditions, generating mappings (e.g., transfer functions) that relate steady-state EGR orifice flow as a function of steady state intake pressure. The maps may correspond to some pre-determined throttle angle (θ), or initial intake pressure ($p_{i,o}$) corresponding to zero EGR flow. In some examples, different maps may be generated for different engine speeds. Then, given the offline generated maps, online measurements of the intake pressure ($p_i$) under DFSO conditions may be used to estimate EGR mass flow across the variable orifice. The estimated EGR mass flow across the variable orifice, a measured differential pressure across the variable orifice, and an EGR orifice equation may be used to estimate variable orifice effective area. Because the variable orifice may vary as a function of EGR valve opening, the calibration process may be performed at different EGR valve openings.

It may be understood that variable orifice effective area may be needed for EGR estimation (because differential pressure is measured across the variable orifice). However, it may be beneficial to estimate EGR valve effective area as well, as mentioned above. To estimate the EGR valve effective area, the estimated EGR mass flow across the variable orifice, an estimated differential pressure across the EGR valve, and the orifice equation may be used to estimate EGR valve effective area.

Figure 4:
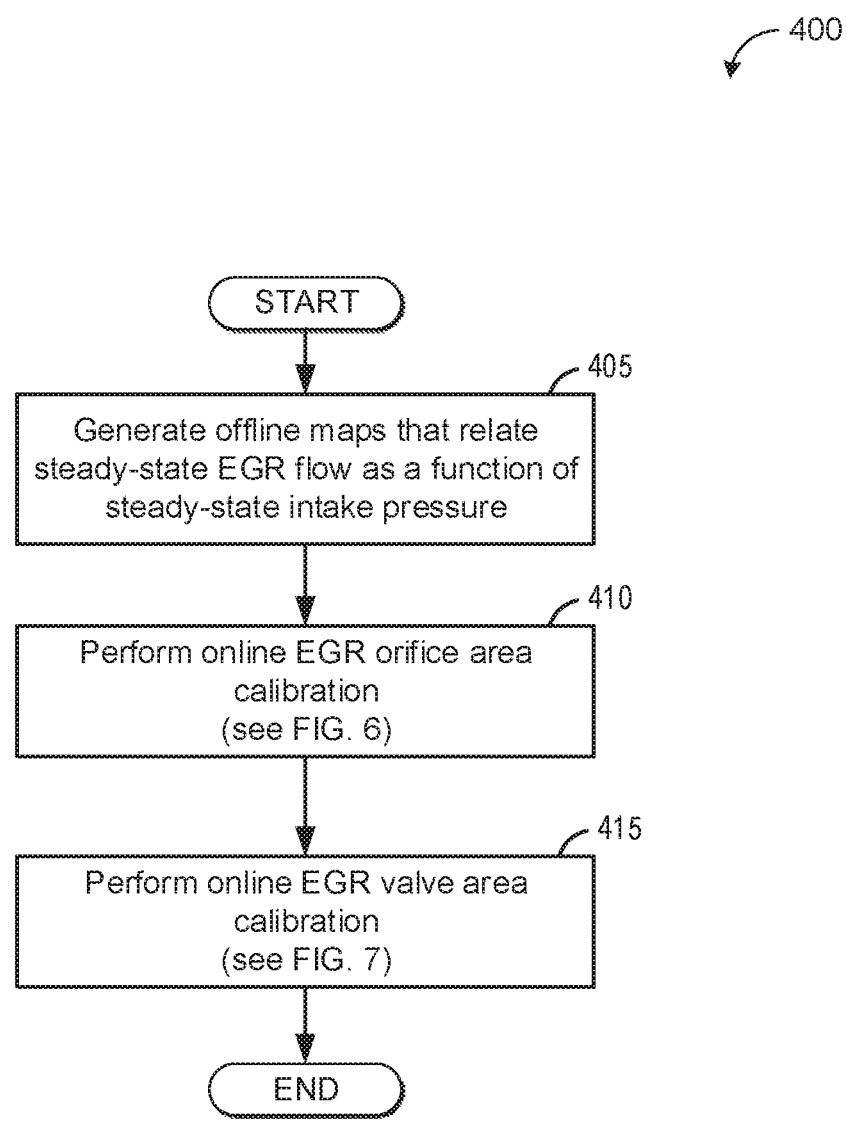
FIG. 4 depicts a high-level example flowchart for calibrating an EGR orifice and an EGR valve of an EGR control apparatus of the present disclosure.
Figure 5:
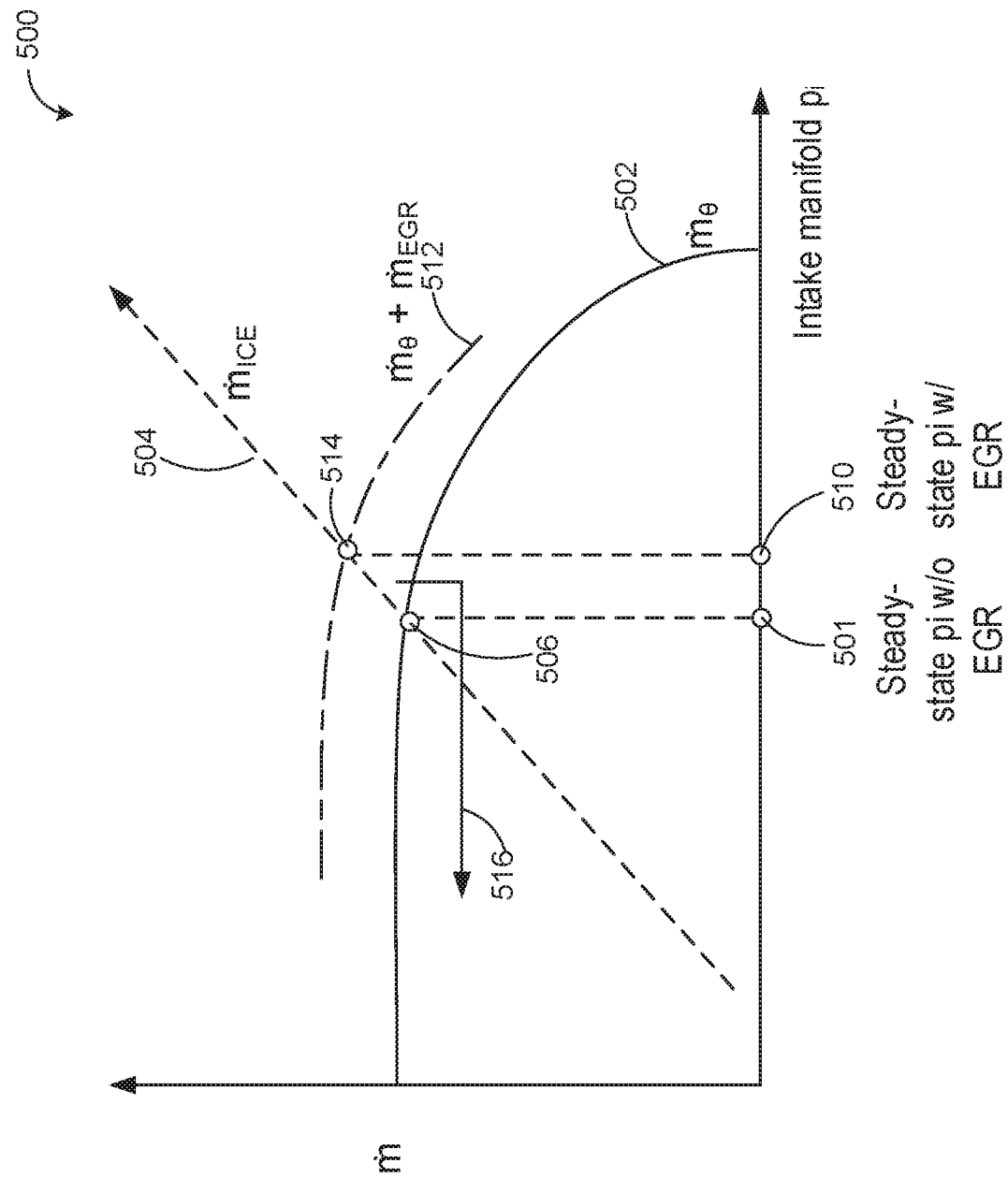
FIG. 5 graphically depicts an example illustration of an intersection of an engine breathing curve and a total flow into an intake manifold of an engine with and without EGR.
Figure 6:
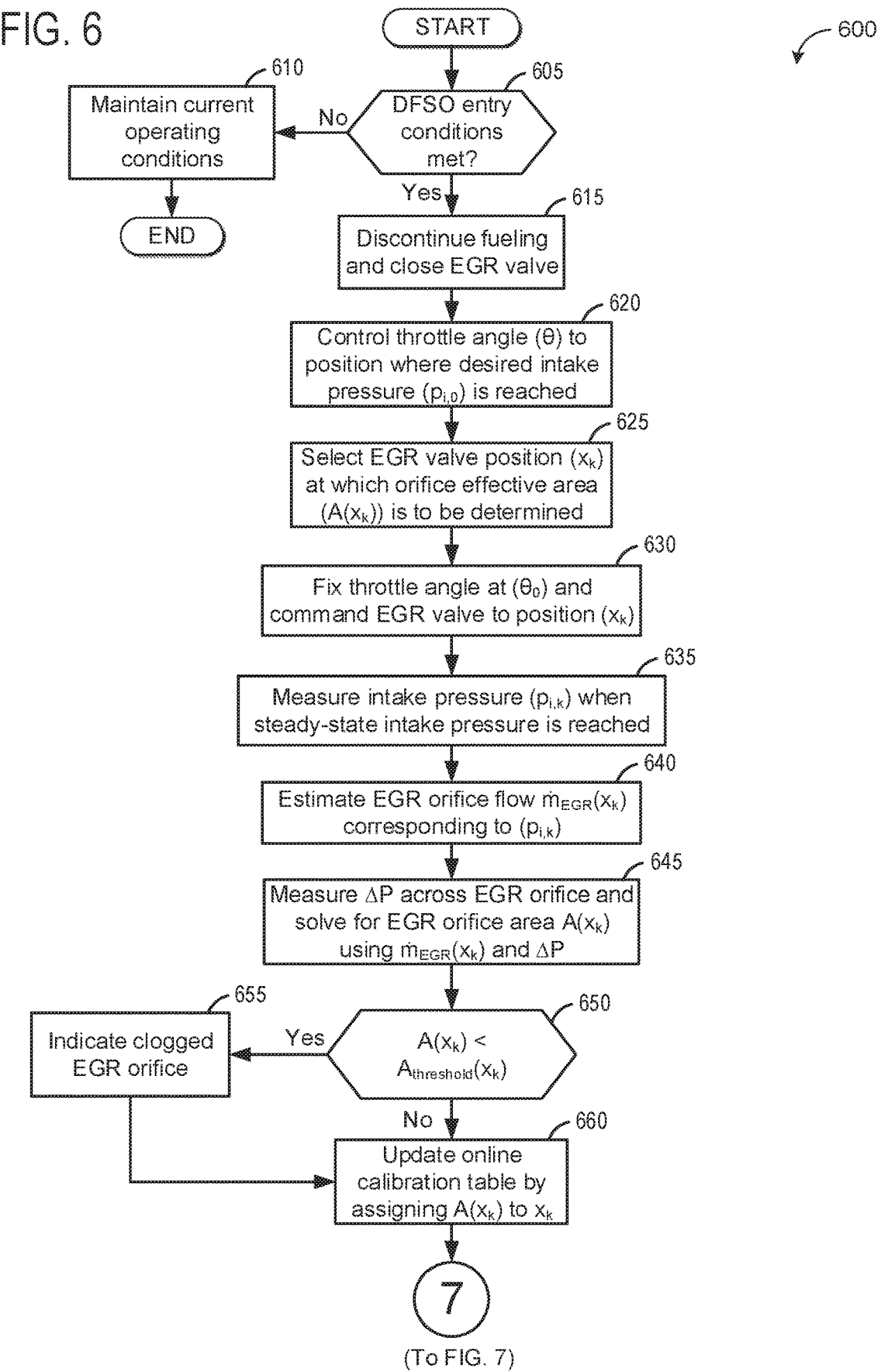
FIG. 6 depicts a high-level example flowchart for conducting the EGR orifice calibration of FIG. 4.
Figure 7:
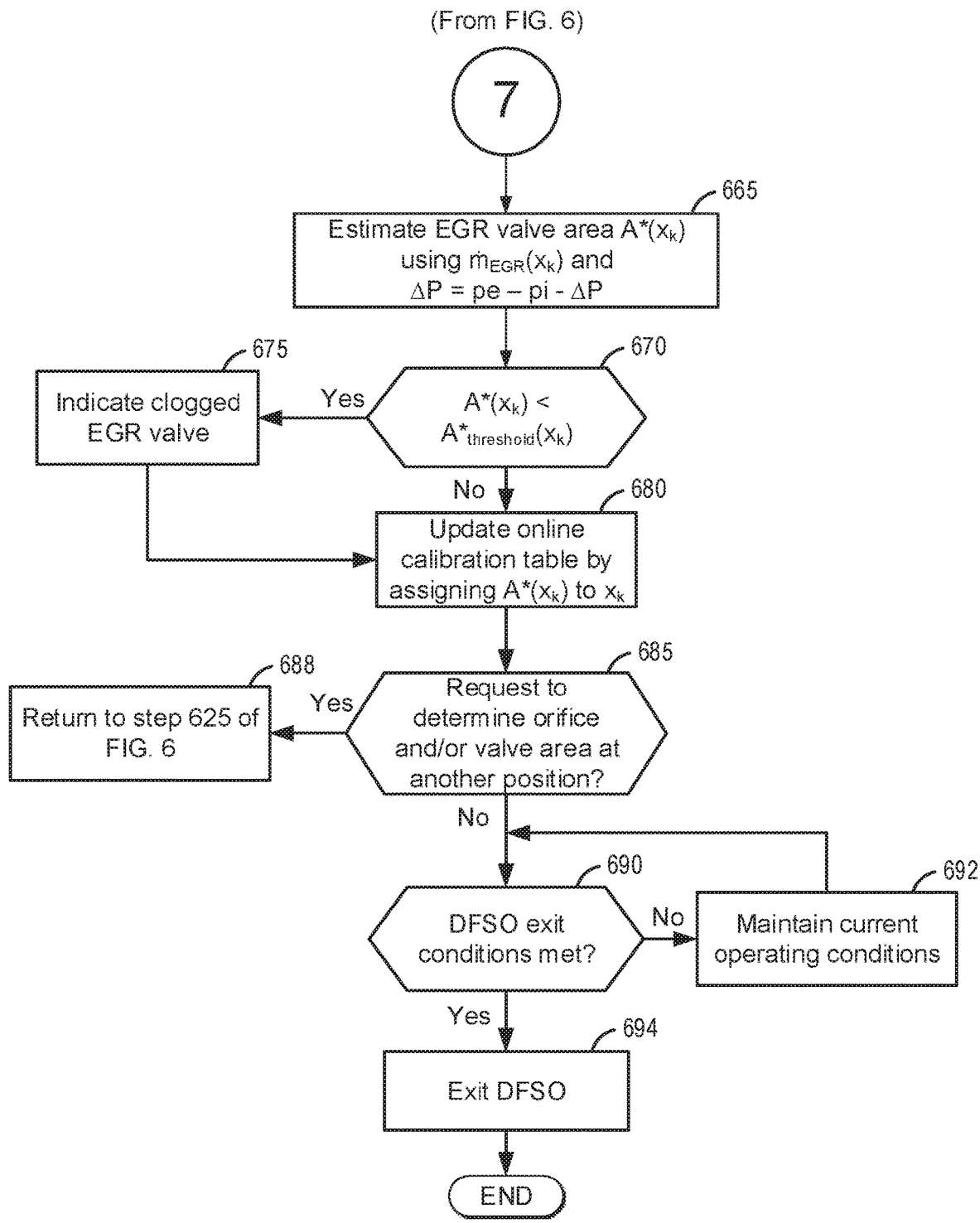
FIG. 7 depicts a high-level example flowchart for conducting the EGR valve calibration of FIG. 4.

Thus, FIG. 4 depicts a high-level example method for generating the mappings, and for determining variable orifice effective area and EGR valve effective area for EGR control apparatuses of the present disclosure. FIG. 5 graphically illustrates a relationship between intake pressure and mass flow of EGR, which is relied upon for generating the mappings discussed herein. FIG. 6 depicts methodology specific for determining variable orifice effective area for EGR control apparatuses of the present disclosure, and FIG. 7 depicts methodology specific for determining EGR valve effective area for EGR control apparatuses of the present disclosure.

Turning now to FIG. 1, depicted is a schematic diagram showing one cylinder of multi-cylinder engine 10, which may be included in a propulsion system of an automobile. Engine 10 (e.g., internal combustion engine, or ICE) may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein. Fuel injection may be via a common rail system, or other such diesel fuel injection system. Fuel may be delivered to fuel injector 66 by a high pressure fuel system (not shown) including a fuel tank, a fuel pump, and a fuel rail. While not explicitly illustrated, it may be understood that where engine 10 is a gasoline engine, a spark plug may be coupled to combustion chamber 30 for igniting an air-fuel mixture within combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR control apparatus 142. While not explicitly illustrated at FIG. 1, it may be understood that EGR control apparatus 142 may include an EGR valve (not shown) and a variable orifice (not shown). One example of EGR control apparatus 142 of the present disclosure that includes an EGR valve and a variable orifice is depicted at FIG. 2A. Another example of EGR control apparatus 142 of the present disclosure that includes an EGR valve and a variable orifice is depicted at FIG. 3A. Briefly, the EGR valve may be used to regulate a flow of exhaust gas from the exhaust manifold to the intake manifold. The variable orifice may be relied upon to estimate EGR flow, for example. Briefly, a differential pressure sensor (not depicted at FIG. 1 but refer to FIG. 2A and FIG. 3A) may be configured to measure a differential pressure across the EGR orifice. The controller (e.g., 12) may rely on the measured differential pressure to infer EGR flow, and may adjust/control engine operation accordingly.

In some examples, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust 02 sensor and/or an intake oxygen sensor (intake manifold). Under some conditions, the EGR system may be used to regulate the temperature of the air and fuel mixture within the combustion chamber. While FIG. 1 shows a high pressure EGR system, additionally, or alternatively, a low pressure EGR system may be used where EGR is routed from downstream of a turbine of a turbocharger to upstream of a compressor of the turbocharger.

As such, engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

In some examples, engine 10 may include exhaust gas pressure sensor 127. Sensor 127 may be any suitable sensor for providing an indication of exhaust passage pressure. As will be elaborated in further detail below, in some examples, exhaust gas pressure sensor 127 may be used at least in part for estimating an area associated with the EGR valve of EGR control apparatus 142.

Engine 10 may in some examples include one or more knock sensor(s) 82. For example, knock sensor 82 may be coupled to each cylinder 30 of engine 10, for identifying abnormal cylinder combustion events. In other examples, one or more knock sensors 82 may be coupled to selected locations of the engine block. In one example, based on output of knock sensor 82 in one or more defined windows (e.g. crank angle timing windows), abnormal combustion due to one or more of knock and pre-ignition may be identified.

Engine 10 may in some examples include one or more in-cylinder pressure sensor(s) 83. For example, each cylinder of engine 10 may include in-cylinder pressure sensor 83, or a select number of cylinders of engine 10 may include in-cylinder pressure sensor(s) 83. The in-cylinder pressure sensor(s) may enable real-time combustion sensing for individual cylinders, and may provide in-cylinder combustion pressure information to enable a combustion parameter calculation to be performed via controller 12.

Engine 10 may in some examples include a torque sensor 84. Generally speaking, torque sensor 84 may include a device for measuring and recording the torque of a rotating system, such as crankshaft 40 (or more generally engine 10). While not explicitly illustrated, in other examples torque sensor 84 may include two angular position sensors whereby the phase angle of twist resulting from applied torque is measured via the two angular position sensors, and from the phase angle, torque (e.g., of crankshaft 40) may be determined.

Emission control system 70 is shown arranged along exhaust passage 48 downstream of exhaust gas sensor 126. System 70 may be a selective catalytic reduction (SCR) system, three way catalyst (TWC), NOx trap, various other emission control devices, or combinations thereof. For example, system 70 may be an SCR system which includes an SCR catalyst 71 and a diesel particulate filter (DPF) 72. In some embodiments, DPF 72 may be located downstream of the catalyst (as shown in FIG. 1), while in other embodiments, DPF 72 may be positioned upstream of the catalyst (not shown in FIG. 1). In some examples, during operation of engine 10, DPF 72 may be periodically regenerated via the use of late post in-cylinder fuel injection to provide hydrocarbons to the exhaust for raising a temperature of DPF 72. Similarly, late post in-cylinder fuel injection may be used during a heat mode, for example at an engine start event, to rapidly raise a temperature of the emission control system 70. Accordingly, an emissions control system temperature sensor 85 may be used for determining when temperature of the DPF, for example, is at a desired temperature (e.g., equal to or greater than a predetermined threshold temperature). Furthermore, a DPF differential pressure sensor 86 may be used to monitor a pressure across DPF 72. DPF regeneration may be requested, for example, when pressure across DPF 72 exceeds a first predetermined pressure threshold. During the process of regenerating DPF 72, pressure across DPF 72 may again be monitored and it may be determined that the regeneration process is complete when pressure is across DPF 72 is below a second predetermined pressure threshold. For example, the second predetermined pressure threshold may be lower than the first predetermined pressure threshold.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug (where included), etc.

In some examples, engine 10 may be included in a hybrid electric vehicle (HEV) or plug-in HEV (PHEV), with multiple sources of torque available to one or more vehicle wheels 198. In the example shown, vehicle system 100 may include an electric machine 195. Electric machine 195 may be a motor or a motor/generator. Crankshaft 40 of engine 10 and electric machine 195 are connected via a transmission 197 to vehicle wheels 198 when one or more clutches 194 are engaged. In the depicted example, a first clutch is provided between crankshaft 199 and electric machine 195, and a second clutch is provided between electric machine 195 and transmission 197. Controller 12 may send a signal to an actuator of each clutch 194 to engage or disengage the clutch, so as to connect or disconnect crankshaft 40 from electric machine 195 and the components connected thereto, and/or connect or disconnect electric machine 195 from transmission 197 and the components connected thereto. Transmission 197 may be a gearbox, a planetary gear system, or another type of transmission. The powertrain may be configured in various manners including as a parallel, a series, or a series-parallel hybrid vehicle.

Electric machine 195 may receive electrical power from a traction battery 196 to provide torque to vehicle wheels 198. Electric machine 195 may also be operated as a generator to provide electrical power to charge traction battery 196, for example during a braking operation.

As mentioned above, in some examples EGR estimation may be accomplished via inferring a pressure difference across a fixed orifice associated an EGR valve. Yet as discussed, there can be challenges related to orifice-sizing associated with the use of fixed orifices. Specifically, reliance on smaller orifices sized to maintain a pressure difference across the orifice above a threshold for accurate flow estimation may restrict EGR flow, and thus benefits, at higher engine speeds and loads. On the other hand, reliance on larger orifices sized to enable a desired EGR flow at higher speeds and loads may result in low pressure differences across the orifice, and thereby degraded EGR estimation accuracy, at lower engine speeds and loads.

To address these issues, discussed herein are two different EGR control apparatuses that each include an EGR valve and a variable area. EGR orifice. These two different EGR control apparatuses may enable, at low EGR flow, reliance on a small area to ensure a sufficiently large pressure difference across the orifice for accurate EGR estimation. Further, a larger orifice area may reduce restriction under circumstances where higher EGR flows are desired.

Accordingly, turning now to FIG. 2A, depicted is an example illustration 200 of an EGR control apparatus 201. It may be understood that EGR control apparatus 201 may be the same as EGR control apparatus 142 depicted above at FIG. 1. EGR control apparatus 201 may include a poppet-valve 203 and variable orifice 205. Poppet-valve 203 may include first plug 206 held against valve seat 207 via spring 209. Specifically, in the absence of external force in the direction of arrow 210, spring 209 may bias first plug 206 against valve seat 207. In other words, in the absence of valve actuation, poppet-valve may have a zero area (e.g., 0 $mm^2$) under conditions where there is no valve degradation (e.g., accumulation of deposits, etc.). As depicted, first plug 206 is disc-shaped, however it may be understood that plug 206 may be other shapes (e.g. rectangular, spherical, triangular, etc.) without departing from the scope of this disclosure. An EGR control apparatus actuator 217 may be used to exert the external force in the direction of arrow 210, for example. The EGR control apparatus actuator 217 may receive commands from the con (e.g. controller 12 at FIG. 1). In some examples, EGR control apparatus actuator 217 may be a motor that, when actuated, results in depression of spring 209. In other examples, the EGR control apparatus actuator 217 may be a solenoid-style actuator whereby different amounts of current applied to the solenoid-style actuator may enable the poppet-valve to be opened to varying degrees as a function of the amount of current applied.

Valve stem 211 couples actuator 217 to plug 206. Valve stem 211 further couples first plug 206 to second plug 212. It may be understood that, discussed herein, second plug 212 is positioned upstream of first plug 206. Specifically, second plug 212 is positioned closer to exhaust passage 48 than first plug 206. Said another way, recirculated exhaust gas may pass through EGR control apparatus 201 from exhaust passage 48 by first passing through second plug 212 and then first plug 206, en route to the intake passage (e.g., intake passage 44 at FIG. 1).

In the absence of external force in the direction of arrow 210 applied to spring 209, it may be understood that second plug 212 is positioned as illustrated at FIG. 2A. When positioned as such, it may be understood that variable orifice 205 is of a non-zero minimum area. Specifically, gap 213 exists between second plug 212 and wall 215 of EGR control apparatus 201. It may be understood that gap 213 contributes to the variable orifice area, discussed herein. A differential pressure sensor 216 may be used to monitor differential pressure across variable orifice 205. Specifically, differential pressure sensor 216 may configured to monitor pressure of an upstream portion 260 of EGR control apparatus respective to a downstream portion 261.

Discussed herein, the upstream portion 260 may be connected to downstream portion 261 via a passage 262. Passage 262 may be defined by wall 215 of EGR control apparatus 201, but may be of a smaller diameter, or width, or area than the upstream portion 260 and the downstream portion. The diameter, or width, or area of passage 262 in relation to a circumference or cross-sectional area or perimeter of second plug 212 may be understood to define gap 213. In some examples a height 263 of second plug 212 and a length 264 associated with passage 262 may be the same as depicted at FIG. 2A. However, in other examples height 263 of second plug 212 and the length 264 may be different, without departing from the scope of this disclosure. Furthermore, there may be a tapered aspect 265 coupling valve stein 218 to second plug 212. An angle at which tapered aspect 265 couples second plug 212 to valve stem 218 and the relationship between height 263 of second plug 212 and length 264 may define how (e.g., rapidly) the variable orifice area (refer gap 213) changes in response to displacement/movement of second plug in the direction of arrow 210.

Thus, FIG. 2A depicts EGR control apparatus 201 in a first configuration. In the first configuration, the absence of external pressure on spring 209 (or in the absence of any actuation of poppet-valve 203) results in first plug 206 seating against valve seat 207 such that poppet valve 203 is fully closed (e.g., zero minimum area). Furthermore, in the first position, the absence of poppet-valve actuation results in second plug 212 being positioned as illustrated, such that variable orifice 205 is of a non-zero minimum area (e.g., due to the presence of gap 213).

Turning now to FIG. 2B, depicted is example illustration 220, showing EGR control apparatus 201 in a second configuration. It may be understood that the numerals used to describe EGR control apparatus 201 at FIG. 2A are the same for FIG. 2B, and thus for clarity and brevity not all numerals are reproduced or discussed with regard to FIG. 2B. As depicted at FIG. 2B, an external force in the direction of arrow 210 (or in other words actuation of poppet-valve 203 to some degree) results in plug 206 unseating from valve seat 207. Thus, poppet valve 203 may be understood to be open to some degree (e.g., non-zero area). Furthermore, second plug 212 moves from its original position as depicted at FIG. 2A, to a second position as depicted at FIG. 2B. However, the movement of second plug 212 from its original position at FIG. 2A to the second position as depicted at FIG. 2B does not substantially change the area associated with variable orifice 205. In other words, gap 213 does not substantially change (e.g., gap 213 changes by 5% or less) when second plug 212 moves from its original position (FIG. 2A) to the second position (FIG. 2B). Said another way, variable orifice area does not substantially change when second plug 212 moves from its original position to the second position. It may be understood that variable orifice area does not substantially change due to the shape of second plug 212 with respect to wall 215 of EGR control apparatus 201 at passage 262, and length 218 (refer to FIG. 2A) between first plug 206 and second plug 212.

Turning now to FIG. 2C, depicted is example illustration 230, showing EGR control apparatus 201 in a third configuration. It may be understood that the numerals used to describe EGR control apparatus 201 at FIG. 2A are the same for FIG. 2C, and thus for clarity and brevity not all numerals are reproduced or discussed with regard to FIG. 2C. As depicted at FIG. 2C, a further external force (e.g., greater than that depicted at FIG. 2B) in the direction of arrow 210 (or in other words further actuation of poppet-valve 203) results in first plug 206 becoming further unseated from valve seat 207, thereby resulting in poppet valve 203 being opened to an even further degree than that depicted at FIG. 2B. Furthermore, second plug 212 moves from the second position (FIG. 2B) to a third position as depicted at FIG. 2C. In going from the second position to the third position, variable orifice area (refer to gap 213) may be understood to substantially change (e.g., changes by greater than 5%).

Turning now to FIG. 2D, example illustration 250 graphically plots area (e.g., poppet-valve 203 area, and variable orifice 205 area) as a function of valve lift (referring to an amount by which poppet-valve 203 is displaced from valve seat 207) for the EGR control apparatus 201 discussed above at FIGS. 2A-2C. Valve lift increases along the x-axis in the direction of the x-axis arrow, and area increases along the y-axis in the direction of the y-axis arrow (refer to inset 251). Plot 252 depicts area associated with poppet valve 203, and plot 254 depicts area associated with variable orifice 205. Dashed box 256 represents EGR control apparatus 201 in the first configuration (refer to FIG. 2A), dashed box 258 represents EGR control apparatus 201 in the second configuration (refer to FIG. 2B), and dashed box 260 represents EGR control apparatus 201 in the third configuration (refer to FIG. 2C).

As exemplified by dashed box 256, when EGR control apparatus 201 is in the first configuration where poppet-valve 203 is not actuated open to any degree (e.g., 0 valve lift), the area associated with poppet valve 203 is 0 (e.g., 0 mm$^2$), as illustrated by plot 252. However, the area associated with variable orifice 205 is a non-zero quantity, as illustrated by plot 254.

As exemplified by dashed box 258, when EGR control apparatus 201 is in the second configuration due to the poppet-valve 203 being actuated open to some degree, the area associated with poppet valve 203 is near its maximum open area, as illustrated by plot 252. However, the area associated with variable orifice 205 has not substantially changed upon EGR control apparatus 201 being controlled to the second configuration, as illustrated by plot 254.

As exemplified by dashed box 260, when EGR control apparatus 201 is in the third configuration due to further actuation of poppet-valve 203, the area associated with poppet valve 203 has reached its maximum open area, as illustrated by plot 252. Furthermore, the area associated with variable orifice 205 is increased substantially (e.g., greater than 5% change), as illustrated by plot 254.

Thus, EGR control apparatus 201 may be understood to reduce issues related to orifice sizing by enabling a smaller area of the variable orifice at lower EGR flow so as to ensure a sufficiently large pressure difference across the variable orifice as required for accurate EGR estimation, while enabling a larger area of the variable orifice at higher EGR flows as desired.

It may be understood that the first configuration, second configuration and third configuration of EGR control apparatus 201 are relied upon for discussion and illustrative purposes. However, EGR control apparatus 201 may be controlled to any number of poppet valve open areas and variable orifice open areas, as exemplified by plots 252 and 254. Furthermore, the shape of the first plug 206 and the second plug 212 as illustrated at FIGS. 2A-2C represent one such example of the EGR control apparatus. However, any number of other shapes are within the scope of this disclosure, provided that the overall behavior of the EGR control apparatus follows the logic laid out graphically at FIG. 2D. Specifically, that at zero valve lift, the area associated with the poppet valve is 0 (e.g., mm$^2$), while the area associated with the variable orifice is a positive, non-zero value. Further, that as valve lift increases, the area associated with the poppet valve increases significantly faster than that of the area associated with the variable orifice.

Furthermore, it may be understood that example illustration 250 depicted at FIG. 2D is meant to be illustrative, and other relationships of valve area and variable orifice area as a function of valve lift are within the scope of this disclosure. For example, while FIG. 2D depicts valve area being nearly maximal at a time when variable orifice area has not substantially changed, in other examples variable orifice area may change more rapidly than that depicted at FIG. 2D as valve area changes (e.g., variable orifice area begins to change substantially when valve area is 50% of maximum, 60% of maximum, 70% of maximum, 80% of maximum, 90% of maximum, etc.). Furthermore, the rates of change of valve area and variable orifice area depicted at FIG. 2I) may be understood to be illustrative, and other rates of change (and respective rates of change between valve area and variable orifice area) for each of the valve area and variable orifice area are within the scope of this disclosure. It may be understood that the rates of change associated with valve area and/or variable orifice area may be modified via altering a shape of one or more of poppet-valve 203 and variable orifice 205 and/or length (e.g., length 218 at FIG. 2A) of the valve stem that couples first plug 206 to second plug 212.

Based on the above, it may be understood that EGR control apparatus includes poppet-valve 203 and variable orifice 205 that are physically coupled, such that actuation of the poppet-valve induces actuation of the variable orifice.

The above description with regard to FIGS. 2A-2D focused on an EGR control apparatus that included a poppet-style valve. However, it is herein recognized that a similar functional operation may be achieved via the use of a butterfly valve. Turning to FIG. 3A, depicted is example illustration 300, showing EGR control apparatus 301. It may be understood that EGR control apparatus 301 may be the same EGR control apparatus as EGR control apparatus 142 depicted above at FIG. 1. EGR control apparatus 301 includes a butterfly valve 303 and a variable orifice 305. It may be understood that variable orifice 305 may be a similar butterfly device/design as that of butterfly valve 303. In order for EGR control apparatus 301 to operate, at least a portion of EGR passage 140 may be of a horseshoe shape as shown at FIG. 3A, such that variable orifice 305 is on a first side 320 of bend 306 and butterfly valve 303 is on a second side 321 of bend 306. A first plate 309 associated with butterfly valve 303 may be sized such that first edges 322 of first plate 309 are flush with (e.g., sealingly engage) walls 308 of EGR passage 140 when butterfly valve 303 is in a fully closed state. At least a portion 324 of edges 322 may remain flush with walls 308 as butterfly valve 303 is increasingly opened. Alternatively, a second plate 310 associated with variable orifice 305 may be sized such that second edges 323 of second plate 310 do not sealingly engage walls 308 of EGR passage 140. In other words, there may be a gap 312 between second plate 310 and walls 308 of EGR passage 140. Gap 312 may contribute to variable orifice area as discussed herein.

Butterfly valve 303 and variable orifice 305 may share a common shaft 314. Shaft 314 may be driven by an EGR control apparatus actuator 315, for example. In some examples, EGR control apparatus actuator 315 may be a motor. Rotational movement of shaft 314 via EGR control apparatus actuator 315 may in turn result in coordinated movement of both butterfly valve 303 and variable orifice 305. Alternatively, in other examples butterfly valve 303 and variable orifice 305 may not share a common shaft 314, but instead may be coupled through gears (e.g., where a first shaft that rotates butterfly valve 303 is coupled to gearing that is in turn coupled to a second shaft that rotates variable orifice 305). It may be understood that in a case where butterfly valve 303 and variable orifice 305 are coupled through gears, bend 306 may be avoided. A differential pressure sensor 316 may be used to monitor pressure across variable orifice 305. Specifically, differential pressure sensor 316 may monitor pressure upstream (e.g., between variable orifice 305 and the exhaust passage) of variable orifice 305 and downstream (e.g., between variable orifice 305 and butterfly valve 303), so as to determine the differential pressure across variable orifice 305.

As depicted, butterfly valve 303 and variable orifice 305 are of a circular shape. It may be understood that illustration 300 depicts both butterfly valve 303 and variable orifice 305 in open configurations. Upon rotation of each of butterfly valve 303 and variable orifice 305 90°, it may be understood that butterfly valve 303 may have a zero area (e.g., 0 mm$^2$), whereas variable orifice 305 may have a positive non-zero area, as a result of gap 312 between second edges 323 and walls 308 of EGR passage 140. Said another way, under conditions where butterfly valve 303 is controlled so as to seal the intake passage from the exhaust passage due to the butterfly valve 303 having a zero area, variable orifice 305 may have a positive non-zero area. While not explicitly illustrated, it may be understood that in some examples, the plate (e.g. 309 and 310) shape and/or surfaces may be selected to optimize a transfer function relating motor angle to area, as may be appreciated by one of at least ordinary skill in the art. Furthermore, it may be understood that in some examples, a relative angular position of variable orifice 305 may be non-zero with respect to butterfly valve 303. For example, the relative angular position of variable orifice 305 may be offset from butterfly valve 303 by 1°, 2°, 3°, 4°, 5°, 10°, 15°, 20°, etc., without departing from the scope of this disclosure.

Turning now to FIG. 3B, example illustration 350 graphically plots area as a function of valve angle for the EGR control apparatus 301 discussed above at FIG. 3A. Valve angle increases along the x-axis in the direction of the x-axis arrow, and area increases in the direction of the y-axis arrow (refer to inset 351). Plot 352 depicts area associated with butterfly valve 303 and plot 354 depicts area associated with variable orifice 305. Dashed box 356 represents EGR control apparatus 301 in a configuration where valve angle is 0° for both butterfly valve 303 and variable orifice 305. It may be understood that at valve angle 0°, butterfly valve 303 seals the intake passage from the exhaust passage. Thus, at a valve angle 0°, area associated with butterfly valve 303 is 0 (e.g., $mm^2$), as depicted by plot 352. However, at valve angle 0°, area associated with variable orifice 305 is of a positive non-zero area, as depicted by plot 354.

As valve angle increases, area associated with butterfly valve 303 increases at a faster rate than that of area associated with variable orifice 305, as depicted by plots 352 and 354, respectively. Thus, EGR control apparatus 301 may be understood to reduce issues related to orifice sizing by enabling a smaller area of the variable orifice at lower EGR flow so as to ensure a sufficiently large pressure difference across the variable orifice as required for accurate EGR estimation, while enabling a larger area at higher EGR flows as desired.

Similar to that discussed above with regard to FIG. 2D, the relationship between valve area and variable orifice area graphically illustrated at FIG. 3B is meant to be illustrative, and the relationship may be altered by modifications to the EGR control apparatus 301. For example, adjusting the relative angular position of variable orifice 305 with respect to butterfly valve 303 may be understood to alter the relationship between valve area and variable orifice area as a function of valve angle. Other modifications are within the scope of this disclosure, to vary the relationship between variable orifice area and valve area as a function of valve angle as desired. As one example, the use of gearing coupling rotation of the butterfly valve 303 to rotation of variable orifice 305 may readily enable an altering of the relationship between variable orifice area and valve area as a function of valve angle.

The above-mentioned EGR control apparatuses as discussed with regard to FIGS. 2A-3B may reduce issues related to orifice sizing as discussed. For such EGR control apparatuses, it may be desirable to periodically perform online calibration processes in order to correct for part-to-part variations and orifice area changes over time that may result due to deposits, etc.

Accordingly, turning now to FIG. 4, an example method 400 for calibrating an EGR control apparatus of the present disclosure, is shown. Method 400 will be described with reference to the systems and components described herein and shown in FIG. 1, FIG. 2A, and FIG. 3A, though it may be appreciated that similar methods may be applied to other systems and components without departing from the scope of this disclosure. Instructions for carrying out method 400 and the rest of the methods included herein may be executed by a controller, such as controller 12 at FIG. 1, based on instructions stored in non-transitory memory, and in conjunction with signals received from sensors of the engine as discussed with regard to FIG. 1. The controller may employ actuators such as the fuel injector(s) (e.g., fuel injector 66 at FIG. 1), throttle plate (e.g. throttle plate 64 at FIG. 1), EGR control apparatus actuator (e.g. EGR control apparatus actuator 217 at FIG. 2A, or EGR control apparatus actuator 315 at FIG. 3A), etc., to alter state of devices in the physical world according to the methods depicted below.

Method 400 begins at 405, and includes generating offline maps (e.g., transfer functions) that relate steady-state EGR flow as a function of steady-state intake pressure. The offline maps may be stored at the controller, for example. Details of how the offline maps are generated will be discussed in further detail below.

With the offline maps generated, method 400 proceeds to 410. At 410, method 400 includes performing online EGR variable orifice area calibration. Briefly, measurements of intake pressure may be used to estimate EGR mass flow at one or more valve opening positions, and then the estimated EGR flow, along with a measured pressure difference across the variable orifice and a variable orifice equation, may be used to estimate the area of the variable orifice. The data obtained may be used to update an online calibration table corresponding to variable orifice effective area as a function of valve position. The online EGR variable orifice area calibration may be conducted according to the method of FIG. 6.

With the online EGR variable orifice area calibration conducted, method 400 proceeds to 415. At 415, method 400 includes performing online EGR valve area calibration. Briefly, EGR valve area may be estimated based on the obtained EGR flow estimate, an estimated differential pressure across the EGR valve (e.g., poppet valve 203), and the orifice equations. The data obtained may in some examples be used to update another online calibration table corresponding to valve effective area as a function of valve position. The online EGR valve area calibration may be conducted according to the method of FIG. 7. With the calibrations completed, method 400 may end.

Returning now to step 405 of method 400, it includes generating offline maps (e.g., transfer functions) that relate steady-state EGR flow as a function of steady state intake pressure, as discussed above. Methodology for generating such offline maps is now discussed. The maps may correspond to some predetermined throttle angle ($\theta_0$), or initial intake pressure ($p_{i,0}$) for zero EGR flow. Different maps may be generated for different engine speeds in some examples. For an understanding of the methodology for generating the offline maps, we now turn to FIG. 5.

FIG. 5 depicts an example illustration 500 that graphically depicts mass flow rate ($\dot{m}$) as a function of intake manifold pressure ($p_i$). At steady state engine operation with no EGR (steady state $p_i$ w/o EGR, 501), it may be understood that the flow into the intake of the engine (throttle mass flow rate ($\dot{m}_\theta$) represented at FIG. 5 by plot 502), and flow out of the intake manifold (engine flow rate ($\dot{m}_{ICE}$), represented at FIG. 5 by plot 504), balance out such that $\dot{m}_\theta = \dot{m}_{ICE}$. Graphically, this corresponds to an intersection 506, in the $\dot{m}$-$p_i$ plane, between the engine breathing curve (plot 504) and the throttle flow curve (plot 502) at some given throttle angle and pre-throttle pressure. Arrow 516 represents choked flow.

At steady state engine operation with EGR due to the EGR valve being commanded open a predetermined amount (steady state $p_i$ w/ EGR, 510), the total flow into the intake of the engine ($\dot{m}_\theta$) plus the EGR mass flow rate ($\dot{m}_{EGR}$) (depicted by plot 512), and flow out of the intake manifold (engine flow rate ($\dot{m}_{ICE}$)) balance out such that $\dot{m}_\theta + \dot{m}_{EGR} = \dot{m}_{ICE}$ (note that this applies to a HP-EGR case and not a low pressure (LP)-EGR case, and may also apply to a naturally aspirated engine with an EGR loop joining the air path post-throttle). Graphically, this corresponds to an intersection 514, in the ṁ-$p_i$ plane, between the engine breathing curve (plot 504) and total flow into the intake manifold (plot 512).

Thus, based on the description with regard to FIG. 5, it may be understood that a steady-state intake pressure, measured for example via the MAP sensor (e.g. MAP sensor 122 at FIG. 1), in response to commanding the EGR valve to a predetermined open position, may enable an estimation of EGR mass flow provided that the appropriate mappings (e.g. transfer functions) have been generated.

Accordingly, it may be understood that the offline process of generating the transfer functions may include, under deceleration fuel shut off (DFSO) conditions, achieving a desired initial intake pressure ($p_{i,0}$) or some predetermined throttle angle ($\theta_0$) with the EGR valve (e.g. poppet valve 203 at FIG. 2A, or butterfly valve 303 at FIG. 3A) closed, and then commanding the EGR valve to a predetermined position. With the EGR valve commanded to the predetermined position, the EGR flow may be determined, as a function intake manifold pressure in relation to intake manifold pressure with the EGR valve closed. Such a process may be repeated any number of times. This process may enable generation of a data set that relates EGR mass flow as a function of intake manifold pressure for a given EGR valve open position. An interpolation process conducted on such a data set may enable any number of data points to be inferred that relate EGR mass flow as a function of intake manifold pressure change for a given EGR valve open position. As discussed, such a process may be conducted for any number of engine speeds. Conducting such a process under DFSO conditions may avoid excessive EGR due to large pressure differences across the variable orifice.

Determining the EGR mass flow as discussed above may include calculating an actual EGR using a probe, for example, that measures $CO_2$ in the intake manifold divided by $CO_2$ in the exhaust manifold, corrected for background $CO_2$ (in other examples intake $O_2$ sensors may be used, where in such a case pressure correction may be needed), as is known in the art. Then, the EGR concentration can be converted into EGR flow using an air flow measurement (e.g., using a MAF sensor or a Laminar Flow Element flowmeter) or air flow calculation (from fuel flow and air-fuel ratio measurements). Such an example may be possible under firing conditions of the engine.

If the offline calibration is to be performed under DFSO conditions, it may be understood that just air is recirculated through the EGR loop, therefore $CO_2$ and $O_2$ based measurements cannot be used (as their concentrations are the same in the intake and exhaust in such a case). Thus, actual EGR flow in such a case may be determined by directly measuring EGR flow (e.g. using a MAF sensor in the EGR loop), or calculated from the pressure drop across the variable orifice and/or valve (whose effective areas are already computed using a steady flow bench). It may be understood that the above methodology is referenced for illustrative purposes, and it is herein recognized that other means of determining actual EGR mass flow may be possible.

Based on the above, it may be understood that transfer functions may be generated that relate intake manifold pressure to EGR mass flow. The transfer functions may then be used for online calibration processes, as discussed above and which will be further elaborated below. In some examples, accuracy of the offline-generated transfer functions may be improved via the use of correction factors that account for effects including, but not limited to, RPM transients, intake temperature variation, EGR cooler out temperature variation, and engine breathing changes.

Accordingly, returning to FIG. 4, with the offline maps generated at 405, method 400 proceeds to 410, where online EGR orifice area calibration may be conducted at appropriate times of vehicle operation. As mentioned above, the online EGR orifice area calibration methodology is discussed with regard to FIG. 6.

Turning now to FIG. 6, an example method 600 for performing an online EGR orifice area calibration of the present disclosure, is shown. Method 600 will be described with reference to the systems and components described herein and shown in FIG. 1, FIG. 2A, and FIG. 3A, through it may be appreciated that similar methods may be applied to other systems and components without departing from the scope of this disclosure. Instructions for carrying out method 600 and the rest of the methods included herein may be executed by a controller, such as controller 12 at FIG. 1, based on instructions stored in non-transitory memory, and in conjunction with signals received from sensors of the engine as discussed with regard to FIG. 1. The controller may employ actuators such as the fuel injector(s) (e.g., fuel injector 66 at FIG. 1), throttle plate (e.g. throttle plate 64 at FIG. 1), EGR control apparatus actuator (e.g. EGR control apparatus actuator 217 at FIG. 2A, or EGR control apparatus actuator 315 at FIG. 3A), etc., to alter state of devices in the physical world according to the methods depicted below.

Method 600 begins at 605, and includes indicating whether conditions are met for entering DFSO. DFSO entry conditions may be based on various vehicle and engine operating conditions. In particular, method 600 may use a combination of one or more of vehicle speed, vehicle acceleration, engine speed, engine load, throttle position, accelerator pedal position, transmission gear position, and various other parameters to determine whether the DFSO entry conditions have been met at 605. In one example, DFSO entry conditions may be based on an engine speed below a threshold speed and/or a change in engine speed greater than a threshold engine speed change. In another example, the DFSO entry conditions may be based on an engine load below a threshold engine load and/or a change in engine load greater than a threshold change in engine load.

If, at 605, it is determined that DFSO entry conditions are not yet met, method 600 proceeds to 610. At 610, method 600 includes maintaining current operating conditions. For example, fuel injection to engine cylinders may be maintained as a function of driver demand. Method 600 may then end. While depicted as ending, it may be understood that during a drive cycle, it may be repeatedly determined as to whether DFSO entry conditions are met, and if so, method 600 may proceed as discussed in further detail below.

Accordingly, returning to 605, responsive to DFSO entry conditions being indicated to be met, method 600 proceeds to 615. At 615, method 600 includes discontinuing fueling by commanding fuel injectors to stop injecting fuel to engine cylinders. Furthermore, at 615, method 600 includes commanding closed the EGR valve (e.g., poppet valve 203 at FIG. 2A or butterfly valve 303 at FIG. 3A). With the EGR valve commanded closed and fueling discontinued, method 600 proceeds to 620. At 620, method 600 includes controlling throttle angle to a position ($\theta_0$) where desired initial intake pressure is reached for the current engine speed. The desired initial intake pressure may be the same as the initial intake pressure ($p_{i,0}$) for zero EGR flow used as discussed above to generate the offline transfer functions at the current speed. As one example, the desired initial intake pressure may be 0.4 bar. However, desired initial intake pressure may be greater than, or less than 0.4 bar without departing from the scope of this disclosure. The MAP sensor (e.g. MAP sensor 122 at FIG. 1) may be used to monitor intake pressure, for example.

Responsive to the desired intake pressure being attained, method 600 proceeds to 625. At 625, method 600 includes selecting an EGR valve position ($x_k$) at which orifice effective area ($A(x_k)$) is to be determined. It may be understood that the EGR valve position ($x_k$) may correspond to valve lift (in the case of the poppet-style valve of FIG. 2A), or valve angle (in the case of the butterfly-style valve of FIG. 3A). The selecting may be carried out by the controller, for example, and may be based on a predetermined schedule that prioritizes which EGR valve position (e.g., which order of valve positioning) to test for the current diagnostic procedure. For example, more than one determination of orifice effective area may be made for a single DFSO event (corresponding to either a single valve position or for different valve positions). However, in other examples just one orifice effective area determination may be made for a single DFSO event. In either case, it may be desirable to obtain additional orifice effective area determinations (for a same valve position or for different valve positions) during subsequent DFSO events.

In some examples, it may be desirable to obtain a plurality of orifice effective area determinations for a single valve position, during a single DFSO event or across more than one DFSO event. This may enable a higher confidence orifice effective area determination, for example, where the orifice effective area determinations for a particular valve position are averaged together.

With the EGR valve position ($x_k$) selected, method 600 proceeds to 630. At 630, method 600 includes fixing the throttle angle at the throttle angle corresponding to the desired intake pressure, and commanding the EGR valve position to the selected position.

Proceeding to 635, method 600 includes measuring intake pressure ($p_{i,k}$) when steady-state intake pressure is reached (e.g., roughly 1.5-2 seconds after commanding the EGR valve position ($x_k$)). Again, the intake pressure may be monitored via the MAP sensor as discussed above.

Continuing to 640, method 600 includes estimating EGR orifice flow ($\dot{m}_{EGR}(x_k)$) corresponding to the intake pressure at the selected valve position ($p_{i,k}$) measured at step 635. Specifically, estimating the EGR orifice flow may be carried out via the controller using the offline generated transfer functions (refer to step 405 at FIG. 4), such that the intake pressure at the selected EGR valve position ($p_{i,k}$) is used as input to the transfer function, and where the transfer function outputs the corresponding EGR orifice flow.

With the EGR orifice flow ($\dot{m}_{EGR}(x_k)$) determined, method 600 proceeds to 645. At 645, method 600 includes measuring a pressure difference ($\Delta P$) across the EGR orifice (e.g. variable orifice 205 at FIG. 2A, or variable orifice 305 at FIG. 3A). As discussed above, measuring the pressure difference across the EGR orifice may be carried out via a differential pressure sensor (e.g. differential pressure sensor 216, or differential pressure sensor 316). With the pressure difference determined at 645, method 600 may include solving for EGR orifice effective area ($A(x_k)$) as a function of the determined EGR orifice flow ($\dot{m}_{EGR}(x_k)$) and the pressure difference across the EGR orifice.

With the EGR orifice effective area determined at 645, method 600 proceeds to 650. At 650, method 600 includes determining whether the EGR orifice effective area ($A(x_k)$) is less than a predetermined threshold EGR orifice effective area ($A_{threshold}(x_k)$). If so, method 600 proceeds to 655, where method 600 includes indicating a clogged EGR orifice. The indicating may include setting a flag at the controller, issuing a diagnostic trouble code (DTC), and/or illuminating a malfunction indicator light at the vehicle dash, to alert the vehicle operator of a request to service the vehicle.

Whether or not a clogged orifice is indicated, method 600 proceeds to 660. At 660, method 600 includes updating an online calibration table by assigning the EGR orifice effective area ($A(x_k)$) to the selected valve position ($x_k$). While method 600 includes updating the online calibration table by assigning the EGR orifice effective area to the selected valve position, in some examples, instead of immediately assigning the newly estimated EGR orifice effective area ($A(x_k)$) to the selected valve position ($x_k$), a weighted average of new EGR orifice effective area determination(s) and old EGR orifice effective area determination(s) may be used to replace the old EGR orifice effective area determination, without departing from the scope of this disclosure.

With the online calibration table updated to include the new EGR orifice effective area determination as a function of the selected valve position, method 600 may proceed to step 665 at FIG. 7. However, in other examples, method 600 may not proceed to step 665 and may instead end without departing from the scope of this disclosure.

Turning now to FIG. 7, at step 665 method 600 includes estimating EGR valve effective area ($A^*(x_k)$). Specifically, although EGR orifice effective area (determined as discussed above) is needed for EGR estimation purposes (due to the $\Delta P$ being measured across the orifice of the EGR control apparatus), it is herein recognized that it may be desirable to estimate EGR valve area as well (to detect clogging, for example).

Accordingly, EGR valve area may be estimated as a function of EGR orifice flow ($\dot{m}_{EGR}(x_k)$) as determined above, and an estimate of a pressure difference across the EGR valve ($\Delta P^*$). Specifically, the estimate of the pressure difference across the EGR valve may be determined based on exhaust pressure ($p_e$) minus intake pressure ($p_i$) minus the pressure difference across the EGR orifice ($\Delta P$) ($\Delta P^* = p_e - p_i - \Delta P$). In other words, the controller may solve for EGR valve area as a function of EGR orifice flow and the estimate of the pressure difference across the EGR valve.

With the EGR valve effective area ($A^*(x_k)$) estimated at 665, method 600 proceeds to 670. At 670, method 600 includes indicating whether the estimated EGR valve effective area ($A^*(x_k)$) is less than a predetermined threshold EGR valve effective area ($A^*threshold(x_k)$). If so, method 600 proceeds to 675, and includes indicating a clogged EGR valve. Similar to that discussed above for the EGR orifice, the indicating may include setting a flag at the controller, issuing a diagnostic trouble code (DTC), and/or illuminating a malfunction indicator light at the vehicle dash, to alert the vehicle operator of a request to service the vehicle.

Whether or not a clogged EGR valve is indicated, method 600 proceeds to 680. At 680, method 600 includes updating an online calibration table by assigning the estimate EGR valve effective area ($A^*(x_k)$) to the selected EGR valve position ($x_k$). While method 600 includes updating the online calibration table by assigning the EGR valve effective area to the selected valve position, in some examples, instead of immediately assigning the newly estimated EGR valve effective area ($A^*(x_k)$) to the selected valve position ($x_k$), a weighted average of new EGR valve effective area determination(s) and old EGR valve effective area determination(s) may be used to replace the old EGR valve effective area determination, without departing from the scope of this disclosure.

With the online calibration table updated at 680, method 600 proceeds to 685. At 685, method 600 includes indicating whether there is a request via the controller to determine orifice and/or valve effective area at another EGR valve position. If so, method 600 proceeds to 688, where method 600 returns to step 625 of method 600. Alternatively, in the absence of such a request, method 600 proceeds to 690.

At 690, method 600 includes querying whether DFSO exit conditions are met. DFSO exit conditions may include a vehicle operator depressing the accelerator pedal by greater than a threshold amount given vehicle operating conditions and/or other relevant parameters. If DFSO exit conditions have not been met, method 600 proceeds to 692 where current operating conditions are maintained. In other words, the vehicle is continued to be operated under DFSO conditions, but further EGR valve and/or EGR orifice effective area determinations are not pursued.

Alternatively, responsive to DFSO exit conditions being met at 690, method 600 includes proceeding to 694. At 694, method 600 includes initiating DFSO exit, where at least fuel injectors are commanded to resume providing fuel to engine cylinders as a function of driver demand. Other pertinent parameters may be returned to normal operating conditions, including but not limited to throttle valve control. Method 600 may then end.

Based on the above description, it may be understood that engine operation may be controlled based on the updated calibration tables, the calibration tables updated via the methodology of FIG. 4 (which includes methodology corresponding to FIGS. 6-7). For example, to achieve a desired amount of EGR flow, engine control strategy may rely on the updated calibration table(s) so as to infer how much to open the EGR valve to achieve the desired amount of EGR flow.

In this way, effective areas associated with an EGR valve and variable orifice for EGR control regulator(s) of the present disclosure may readily be determined based on intake manifold pressure and a measurement of differential pressure across the variable orifice (and in some examples an estimate of differential pressure across the EGR valve).

The technical effect of determining areas associated with the EGR valve and/or variable orifice associated with EGR control regulators of the present disclosure is to enable accurate EGR control for EGR control regulators that allow for small orifice area at lower EGR flow and greater orifice area at higher EGR flow. Accordingly, at lower EGR flows, the smaller orifice area may enable a sufficiently large differential pressure across the variable orifice to enable accurate EGR estimation, while also preventing restriction of higher EGR flow when higher EGR flows are requested.

In another embodiment, an EGR control regulator includes a poppet valve and a variable orifice, the poppet valve comprised of a first plug and the variable orifice comprised of a second plug, where the poppet valve has a zero effective area when fully closed and where the variable orifice has a positive non-zero minimum effective area when the poppet valve is fully closed. In one example, the first plug and the second plug are physically coupled via a valve stem that moves in response to actuation of a single actuator. In another example, a first area associated with the variable orifice remains substantially unchanged as a second area associated with the poppet valve approaches a maximum open position. For example, the first area may change by less than a threshold (e.g., by less than 5%) at a time when the second area exceeds 60% of a maximum open area. In other examples, the first area may change by less than the threshold when the second area exceeds 65%, 70%, 75%, 80%, 85%, 90%, or 95% of the maximum open area.

In another embodiment, an EGR control regulator includes a butterfly valve and a variable orifice, the butterfly valve comprised of a first plate and the variable orifice comprised of a second plate, where the butterfly valve has a zero effective area when fully closed and where the variable orifice has a positive non-zero minimum effective area when the butterfly valve is fully closed. In one example, the first plate and the second plate are physically coupled via a common shaft that rotates in response to actuation of a single motor. In other examples rotation of the first plate is coupled to rotation of the second plate through gearing. The first plate may be positioned on a first side of a bend in an EGR passage that includes the EGR control regulator, and the second plate may be positioned on a second side of a bend in the EGR passage. In one example, a first area associated with the variable orifice remains substantially unchanged as a second area associated with the butterfly valve approaches a maximum open position. For example, the first area may change by less than a threshold (e.g., by less than 5%) at a time when the second area exceeds 60% of a maximum open area. In other examples, the first area may change by less than the threshold when the second area exceeds 65%, 70%, 75%, 80%, 85%, 90%, or 95% of the maximum open area.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
an exhaust gas recirculation passage that couples an exhaust passage of an engine to an intake passage of the engine, the exhaust gas recirculation passage including an exhaust gas recirculation control apparatus that includes both an exhaust gas recirculation valve and a variable orifice; and
a controller with computer readable instructions stored on non-transitory memory that when executed, cause the controller to:
infer an exhaust gas recirculation mass flow rate across the variable orifice based on a test pressure in the intake passage with the exhaust gas recirculation valve commanded to a predetermined open position; and
estimate a variable orifice effective area based on the exhaust gas recirculation mass flow rate and a measured differential pressure across the variable orifice, and estimate an exhaust gas recirculation valve effective area based on the exhaust gas recirculation mass flow and an estimated differential pressure across the exhaust gas recirculation valve.

2. The system of claim 1, further comprising a manifold absolute pressure sensor positioned in the intake passage; and
wherein the controller stores further instructions to determine the test pressure based on output from the manifold pressure sensor.

3. The system of claim 1, further comprising a differential pressure sensor for monitoring pressure across the variable orifice; and
wherein the controller stores further instructions to obtain the measured differential pressure across the variable orifice based on output from the differential pressure sensor.

4. The system of claim 1,
wherein the controller stores further instructions to estimate the differential pressure across the exhaust gas recirculation valve based on a difference between an estimated or measured exhaust pressure, the test pressure and the measured differential pressure across the variable orifice.

5. The system of claim 1, wherein the variable orifice is located at a position closer to the exhaust passage than the exhaust gas recirculation valve.

6. The system of claim 1, wherein the exhaust gas recirculation valve has a zero area when in a fully closed configuration; and
wherein the variable orifice has a positive non-zero minimum area when the exhaust gas recirculation valve is in the fully closed configuration.

7. The system of claim 1, wherein the controller stores further instructions to infer the exhaust gas recirculation mass flow rate based on a transfer function that uses the test pressure as input and in return outputs the exhaust gas recirculation mass flow rate.

8. The system of claim 1, further comprising a throttle included in the intake of the engine; and
wherein the controller stores further instructions to: control the throttle so as to obtain a baseline steady-state pressure in the intake passage of the engine with the exhaust gas recirculation valve closed;
fix a position of the throttle in response to the baseline pressure being attained; and
command the exhaust gas recirculation valve to the predetermined position, and record the test pressure upon pressure in the intake passage stabilizing.

9. The system of claim 1, further comprising fuel injectors for providing fuel to cylinders of the engine; and
wherein the controller stores further instructions to infer the exhaust gas recirculation mass flow rate based on the test pressure under conditions where fueling to the cylinders of the engine via the fuel injectors is discontinued.

10. A method comprising:
controlling a pressure in an intake of an engine to a first steady-state intake pressure with an exhaust gas recirculation valve closed;
commanding the exhaust gas recirculation valve open and determining a second steady-state intake pressure and a differential pressure across a variable orifice associated with the exhaust gas recirculation valve; and
estimating a variable orifice effective area based on the second steady-state intake pressure and the differential pressure,
wherein the exhaust gas recirculation valve and the variable orifice are different.

11. The method of claim 10, wherein the exhaust gas recirculation valve and the variable orifice are included as part of an exhaust gas recirculation control apparatus positioned in an exhaust gas recirculation passage.

12. The method of claim 11, wherein each of the exhaust gas recirculation valve and the variable orifice are actuated via a common actuator.

13. The method of claim 10, further comprising obtaining a set of transfer functions that relate the pressure in the intake of the engine to an exhaust gas recirculation mass flow across the variable orifice at different open positions of the exhaust gas recirculation valve; and
wherein estimating the variable orifice effective area based on the second steady-state intake pressure and the differential pressure further includes relying on a transfer function selected from the set of transfer functions to infer the exhaust gas recirculation mass flow across the variable orifice as a function of the second steady-state pressure, and using the exhaust gas recirculation mass flow across the variable orifice and the differential pressure to estimate the variable orifice effective area.

14. The method of claim 10, further comprising:
estimating an exhaust gas recirculation valve effective area based on the exhaust gas recirculation mass flow across the variable orifice as a function of the second steady-state pressure and an estimated pressure difference across the exhaust gas recirculation valve.

15. The method of claim 10, wherein commanding the exhaust gas recirculation valve open further comprises commanding the exhaust gas recirculation valve to a predetermined open position; and responsive to the variable orifice effective area being estimated, updating a first calibration table by assigning the variable orifice effective area to the predetermined open position of the exhaust gas recirculation valve.

16. The method of claim 10, wherein the exhaust gas recirculation valve has a zero effective area when commanded fully closed; and wherein the variable orifice has a positive non-zero area under conditions where the exhaust gas recirculation valve is fully closed.

17. The method of claim 10, further comprising controlling the pressure in the intake to the first steady-state pressure with the exhaust gas recirculation valve closed and commanding the exhaust gas recirculation valve open and determining the second steady-state intake pressure and the differential pressure during deceleration fuel shut off conditions of the engine.

18. A method comprising:

estimating an exhaust gas recirculation mass flow across a variable orifice based on a steady-state pressure in an intake of an engine attained upon commanding an exhaust gas recirculation valve from a closed position to a predetermined open position;

inferring a variable orifice effective area based on the exhaust gas recirculation mass flow and a differential pressure recorded across the variable orifice with the exhaust gas recirculation valve in the predetermined open position;

updating a calibration table to include the variable orifice effective area corresponding to the predetermined open position; and controlling an amount of recirculated exhaust gas based on the updated calibration table.

19. The method of claim 18, wherein the variable orifice and the exhaust gas recirculation valve are included in an exhaust gas recirculation control apparatus that is positioned in an exhaust gas recirculation passage; and wherein an area of the variable orifice changes as a function of a position of the exhaust gas recirculation valve.

20. The method of claim 18, wherein estimating the exhaust gas recirculation mass flow across the variable orifice based on the steady-state pressure in the intake is based on previously attained mappings that relate steady-state exhaust gas recirculation mass flow as a function of steady-state intake pressure.

* * * * *